(12) United States Patent
Fetzer

(10) Patent No.: US 7,765,465 B2
(45) Date of Patent: Jul. 27, 2010

(54) ENHANCED ELECTRONIC DATA INTERCHANGE (EDI) REPORTING WITH HYPERLINKS TO EDI SOURCE INFORMATION

(75) Inventor: Stephanie A. Fetzer, Huntersville, NC (US)

(73) Assignee: International Business Machines Corporation, Armonk, NY (US)

(*) Notice: Subject to any disclaimer, the term of this patent is extended or adjusted under 35 U.S.C. 154(b) by 1094 days.

(21) Appl. No.: 11/381,937

(22) Filed: May 5, 2006

(65) Prior Publication Data

US 2007/0260969 A1    Nov. 8, 2007

(51) Int. Cl.
*G06F 17/22* (2006.01)
*G06F 17/00* (2006.01)

(52) U.S. Cl. .................. 715/205; 715/206; 715/207; 715/208; 715/234

(58) Field of Classification Search .................. 715/234
See application file for complete search history.

(56) References Cited

U.S. PATENT DOCUMENTS

| 5,794,206 | A  | * | 8/1998  | Wilkinson et al. | 705/1   |
|-----------|----|---|---------|------------------|---------|
| 7,447,707 | B2 | * | 11/2008 | Gaurav et al.    | 707/104.1 |
| 2002/0049790 | A1 | * | 4/2002 | Ricker et al.  | 707/513 |
| 2002/0198791 | A1 | * | 12/2002 | Perkowski     | 705/26  |
| 2003/0121001 | A1 | * | 6/2003 | Jeannette et al. | 715/513 |
| 2005/0257193 | A1 | * | 11/2005 | Falk et al.   | 717/109 |
| 2007/0204214 | A1 | * | 8/2007 | Gaurav et al.  | 715/513 |

* cited by examiner

*Primary Examiner*—Stephen S Hong
*Assistant Examiner*—I-Chan Yang
(74) *Attorney, Agent, or Firm*—Patents on Demand, P.A.; Brian K. Buchheit; Scott M. Garrett

(57) ABSTRACT

An interface for reporting electronic data interchange (EDI) results can include an EDI report section and an EDI source section. The EDI report section can interactively present EDI reports for EDI source data. The EDI source section can interactively present EDI source data for which one of the EDI reports has been generated. The EDI reports and the EDI source data can be markup based documents. Each EDI report rendered within the EDI report section can include one or more hyperlinks. Each rendered hyperlinks can be mapped to a designated portion of the EDI source data.

14 Claims, 5 Drawing Sheets

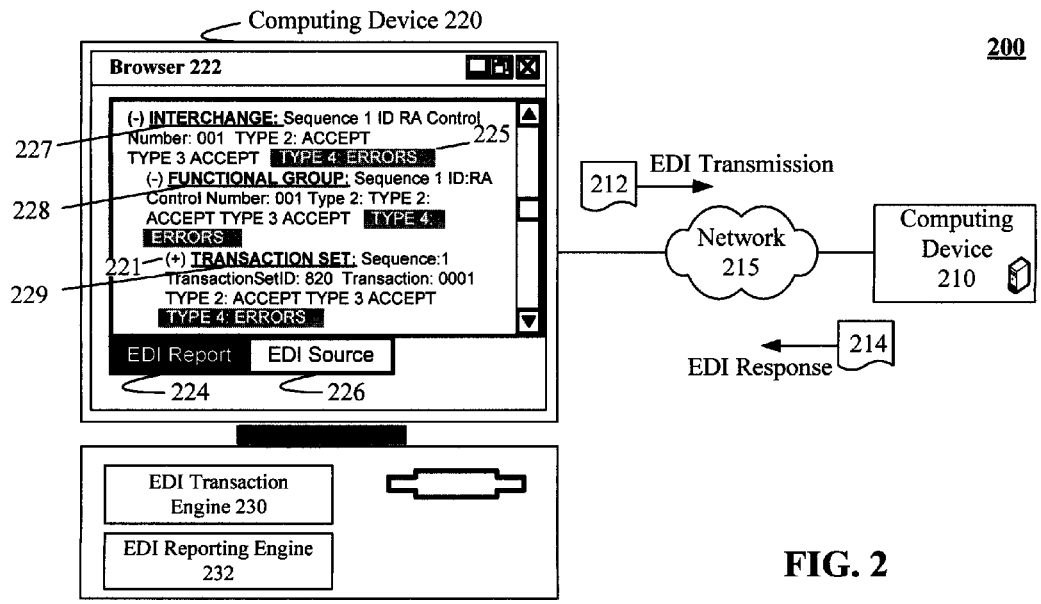

FIG. 2

```
ISA*00*    *00*    *ZZ*MERCATOR_PS  *ZZ*MERCATOR_DEV                    310
*010806*1200*U*00401*000000001*0*T*:
GS*RA*PROFSERV*DEVELOPMENT*20010101*120000*001*X*004010X061
ST*820*0001
BPR*C*19000.00*C*ACH*CTX*01*999999992*DA*12345678*1030449999**01*199999999*DA*98765*1
9970516
TRN*1*12345*1030449999
```

```
<HTML><HEAD><Link rel="stylesheet" type="text/css" href="compliance_check_tack.css"></Link></    320
HEAD><BODY><PRE><LI><A NAME="EXI1">1: ISA*00*    *00*    *ZZ*MERCATOR_PS
*ZZ*MERCATOR_DEV  *010806*1200*U*00401*000000001*0*T*:</A></LI><LI><A NAME="EXI1F1">2:
GS*RA*PROFSERV*DEVELOPMENT*20010101*120000*001*X*004010X061
</A></LI><LI><A NAME="EXI1F1T1">3: ST*820*0001
</A></LI><LI><A NAME="EXI1F1T1S2">4:
BPR*C*19000.00*C*ACH*CTX*01*999999992*DA*12345678*1030449999**01*199999999*DA*98765*1997
0516
</A></LI><LI><A NAME="EXI1F1T1S3">5: TRN*1*12345*1030449999
```

FIG. 3

```
TRANSMISSION                                                                                    410
    Sequence:  File="C:\Ascential\DataStageTX_8.0\packs\healthcare_v4.2\maps\..\data\
    all_BAD_hipaa_4010a1_ig_transaction_sets.dat"
    TYPE 2: ERRORS NOTED    TYPE 3: ERRORS NOTED    TYPE 4: ERRORS NOTED
    INTERCHANGE  Sequence: 1  Control Number: 000000001
          TYPE 2: ACCEPT    TYPE 3: ACCEPT    TYPE 4: ERRORS NOTED
          FUNCTIONAL GROUP Sequence: 1  ID: RA  Control Number: 001
                TYPE 2: ACCEPT    TYPE 3: ACCEPT    TYPE 4: ERRORS NOTED
                TRANSACTION SET Sequence: 1  TransationSetID: 820  Transaction Set Control Number: 0001
                      TYPE 2: ACCEPT    TYPE 3: ACCEPT    TYPE 4: REJECT
                      SEGMENT At position: 3  TRN {Trace}
                            TYPE 4: error
                            ELEMENT TRN03 {Originating Company Identifier}
Links 415                         TYPE 4: error
                                  Error Code: 848 {Incorrect Data}
                                  Error Description: 27854 BPR10 = TRN03
                TRANSACTION SET Sequence: 2  TransationSetID: 820  Transaction Set Control Number: 0002
                      TYPE 2: ACCEPT    TYPE 3: ACCEPT    TYPE 4: ACCEPT
                TRANSACTION SET Sequence: 3  TransationSetID: 820  Transaction Set Control Number: 0003
                      TYPE 2: ACCEPT    TYPE 3: ACCEPT    TYPE 4: ACCEPT
                TRANSACTION SET Sequence: 4  TransationSetID: 820  Transaction Set Control Number: 0004
                      TYPE 2: ACCEPT    TYPE 3: ACCEPT    TYPE 4: ACCEPT
    INTERCHANGE  Sequence: 2  Control Number: 000000002
          TYPE 2: ACCEPT    TYPE 3: ERRORS NOTED    TYPE 4: ACCEPT
          FUNCTIONAL GROUP Sequence: 1  ID: HP  Control Number: 001
                TYPE 2: ACCEPT    TYPE 3: ERRORS NOTED    TYPE 4: ACCEPT
                TRANSACTION SET Sequence: 1  TransationSetID: 835  Transaction Set Control Number: 0001
                      TYPE 2: ACCEPT    TYPE 3: REJECT    TYPE 4: ACCEPT
                      SEGMENT At position: 19  SVC {Service Information}  in loop 2110
                            TYPE 3: error
                            ELEMENT SVC03 {Monetary Amount}
                                  TYPE 3: error
                                  Error Code: 010 {Total Out of Balance}
                                  Error Description: 28136 2110 SVC03 must equal SVC02 - SUM of
                                  2110 CAS amounts
                TRANSACTION SET Sequence: 2  TransationSetID: 835  Transaction Set Control Number: 0002
                      TYPE 2: ACCEPT    TYPE 3: ACCEPT    TYPE 4: ACCEPT
    INTERCHANGE  Sequence: 3  Control Number: 000000003
          TYPE 2: ACCEPT    TYPE 3: ACCEPT    TYPE 4: ACCEPT
          FUNCTIONAL GROUP Sequence: 1  ID: HS  Control Number: 001
                TYPE 2: ACCEPT    TYPE 3: ACCEPT    TYPE 4: ACCEPT
                TRANSACTION SET Sequence: 1  TransationSetID: 270  Transaction Set Control Number: 0001
                      TYPE 2: ACCEPT    TYPE 3: ACCEPT    TYPE 4: ACCEPT
                TRANSACTION SET Sequence: 2  TransationSetID: 270  Transaction Set Control Number: 0002
                      TYPE 2: ACCEPT    TYPE 3: ACCEPT    TYPE 4: ACCEPT
                TRANSACTION SET Sequence: 3  TransationSetID: 270  Transaction Set Control Number: 0003
                      TYPE 2: ACCEPT    TYPE 3: ACCEPT    TYPE 4: ACCEPT
                TRANSACTION SET Sequence: 4  TransationSetID: 270  Transaction Set Control Number: 0004
                      TYPE 2: ACCEPT    TYPE 3: ACCEPT    TYPE 4: ACCEPT
          FUNCTIONAL GROUP Sequence: 2  ID: HB  Control Number: 002
                TYPE 2: ACCEPT    TYPE 3: ACCEPT    TYPE 4: ACCEPT
                TRANSACTION SET Sequence: 1  TransationSetID: 271  Transaction Set Control Number: 0001
                      TYPE 2: ACCEPT    TYPE 3: ACCEPT    TYPE 4: ACCEPT
                TRANSACTION SET Sequence: 2  TransationSetID: 271  Transaction Set Control Number: 0002
                      TYPE 2: ACCEPT    TYPE 3: ACCEPT    TYPE 4: ACCEPT
                TRANSACTION SET Sequence: 3  TransationSetID: 271  Transaction Set Control Number: 0003
                      TYPE 2: ACCEPT    TYPE 3: ACCEPT    TYPE 4: ACCEPT
                TRANSACTION SET Sequence: 4  TransationSetID: 271  Transaction Set Control Number: 0004
                      TYPE 2: ACCEPT    TYPE 3: ACCEPT    TYPE 4: ACCEPT
```

FIG. 4

```
<HTML><HEAD><SCRIPT TYPE="TEXT/JAVASCRIPT">
function openShut(gif, list)
// expand-contract list based on passed in UL ID
{
var style = document.getElementById(list).style;
if (style.display == "none") {
style.display = "block";
document.getElementById(gif).src="minus.GIF";
document.getElementById(gif).alt="Close";
}
else
{
style.display="none";
document.getElementById(gif).src="plus.GIF";
document.getElementById(gif).alt="Open";
}
}
</SCRIPT><TITLE>Compliance Check HTML Readable Results</TITLE><link rel="stylesheet" type="text/css"
href="compliance_check_tack.css"/></HEAD><BODY><PRE><B class="errortext">TRANSMISSION</B><UL ID="ex1"
class="plaintext"><!-- --> Sequence:  File="C:\Ascential\DataStageTX_8.0\packs\healthcare_v4.2\maps\..\data\
all_BAD_hipaa_4010a1_ig_transaction_sets.dat"<!-- --><LI><!-- status --> <!-- status --> TYPE 2: ERRORS
NOTED   <!-- status --> TYPE 3: ERRORS NOTED   <!-- status --> TYPE 4: ERRORS NOTED </LI><!-- --><LI><IMG
id="gifI1" src="minus.GIF" alt="Close" onClick="openShut('gifI1','exI1')"><A HREF="TAck_EDI.html#exI1"><B
class="errortext">INTERCHANGE </B></A></IMG> Sequence: 1  Control Number: 000000001</LI><UL ID="exI1"
class="plaintext"><!-- --><LI><!-- status --> <!-- status --> TYPE 2: ACCEPT   <!-- status --> TYPE 3:
ACCEPT   <!-- status --> TYPE 4: ERRORS NOTED </LI><!-- --><LI><IMG id="gifI1F1" src="minus.GIF"
alt="Close" onClick="openShut('gifI1F1','exI1F1')"><A HREF="TAck_EDI.html#exI1F1"><B
class="errortext">FUNCTIONAL GROUP</B></A></IMG> Sequence: 1  ID: RA  Control Number: 001</LI><UL
ID="exI1F1" class="plaintext"><!-- --><LI><!-- status --> <!-- status --> TYPE 2: ACCEPT   <!-- status -->
TYPE 3: ACCEPT   <!-- status --> TYPE 4: ERRORS NOTED </LI><!-- --><LI><IMG id="gifI1F1T1" src="minus.GIF"
alt="Close" onClick="openShut('gifI1F1T1','exI1F1T1')"><A HREF="TAck_EDI.html#exI1F1T1"><B
class="rejecttext">TRANSACTION SET</B></A></IMG> Sequence: 1  TransactionSetID: 820  Transaction Set Control
Number: 0001</LI><UL ID="exI1F1T1" class="plaintext"><!-- --><LI><!-- status --> <!-- status --> TYPE 2:
ACCEPT   <!-- status --> TYPE 3: ACCEPT   <!-- status --> TYPE 4: REJECT </LI><!-- --><LI><IMG
id="gifI1F1T1W41S" src="minus.GIF" alt="Close" onClick="openShut('gifI1F1T1W41S','exI1F1T1W41S')"><A
HREF="TAck_EDI.html#exI1F1T1S3"><B class="rejecttext">SEGMENT</B></A></IMG> At position: 3  TRN {Trace} </
LI><UL ID="exI1F1T1W41S" class="plaintext"><!-- --><LI> TYPE 4: error</LI><!-- --><LI><IMG
id="gifI1F1T1W41S1" src="minus.GIF" alt="Close" onClick="openShut('gifI1F1T1W41S1','exI1F1T1W41S1')"><B
class="rejecttext">ELEMENT</B></IMG> TRN03 (Originating Company Identifier)</LI><UL ID="exI1F1T1W41S1"
class="plaintext"><!-- --><LI>TYPE 4: error</LI><LI>Error Code: 848 {Incorrect Data}</LI><LI>Error
Description: 27854 BPR10 = TRN03</LI></UL></UL></UL><!-- --><LI><IMG id="gifI1F1T2" src="minus.GIF"
alt="Close" onClick="openShut('gifI1F1T2','exI1F1T2')"><A HREF="TAck_EDI.html#exI1F1T2"><B
class="accepttext">TRANSACTION SET</B></A></IMG> Sequence: 2  TransactionSetID: 820  Transaction Set Control
Number: 0002</LI><UL ID="exI1F1T2" class="plaintext"><!-- --><LI><!-- status --> <!-- status --> TYPE 2:
ACCEPT   <!-- status --> TYPE 3: ACCEPT   <!-- status --> TYPE 4: ACCEPT </LI></UL><!-- --><LI><IMG
id="gifI1F1T3" src="minus.GIF" alt="Close" onClick="openShut('gifI1F1T3','exI1F1T3')"><A
HREF="TAck_EDI.html#exI1F1T3"><B class="accepttext">TRANSACTION SET</B></A></IMG> Sequence: 3
TransactionSetID: 820  Transaction Set Control Number: 0003</LI><UL ID="exI1F1T3" class="plaintext"><!-- --
><LI><!-- status --> <!-- status --> TYPE 2: ACCEPT   <!-- status --> TYPE 3: ACCEPT   <!-- status --> TYPE
4: ACCEPT </LI></UL><!-- --><LI><IMG id="gifI1F1T4" src="minus.GIF" alt="Close"
onClick="openShut('gifI1F1T4','exI1F1T4')"><A HREF="TAck_EDI.html#exI1F1T4"><B
class="accepttext">TRANSACTION SET</B></A></IMG> Sequence: 4  TransactionSetID: 820  Transaction Set Control
Number: 0004</LI><UL ID="exI1F1T4" class="plaintext"><!-- --><LI><!-- status --> <!-- status --> TYPE 2:
ACCEPT   <!-- status --> TYPE 3: ACCEPT   <!-- status --> TYPE 4: ACCEPT </LI></UL></UL></UL><!-- --
><LI><IMG id="gifI2" src="minus.GIF" alt="Close" onClick="openShut('gifI2','exI2')"><A
HREF="TAck_EDI.html#exI2"><B class="errortext">INTERCHANGE </B></A></IMG> Sequence: 2  Control Number:
000000002</LI><UL ID="exI2" class="plaintext"><!-- --><LI><!-- status --> <!-- status --> TYPE 2: ACCEPT
<!-- status --> TYPE 3: ERRORS NOTED   <!-- status --> TYPE 4: ACCEPT </LI><!-- --><LI><IMG id="gifI2F1"
src="minus.GIF" alt="Close" onClick="openShut('gifI2F1','exI2F1')"><A HREF="TAck_EDI.html#exI2F1"><B
class="errortext">FUNCTIONAL GROUP</B></A></IMG> Sequence: 1  ID: HP  Control Number: 001</LI><UL
ID="exI2F1" class="plaintext"><!-- --><LI><!-- status --> <!-- status --> TYPE 2: ACCEPT   <!-- status -->
TYPE 3: ERRORS NOTED   <!-- status --> TYPE 4: ACCEPT </LI><!-- --><LI><IMG id="gifI2F1T1" src="minus.GIF"
alt="Close" onClick="openShut('gifI2F1T1','exI2F1T1')"><A HREF="TAck_EDI.html#exI2F1T1"><B
class="rejecttext">TRANSACTION SET</B></A></IMG> Sequence: 1  TransactionSetID: 835  Transaction Set Control
Number: 0001</LI>
```

ENHANCED ELECTRONIC DATA INTERCHANGE (EDI) REPORTING WITH HYPERLINKS TO EDI SOURCE INFORMATION

BACKGROUND

1. Field of the Invention

The present invention relates to the field of Electronic Data Interchange (EDI) reporting and, more particularly, to EDI reporting with hyperlinks to EDI source information.

2. Description of the Related Art

Electronic Data Interchange (EDI) provides for a computer-to-computer exchange of structured business information, by agreed message standards, from one computer application to another by electronic means with a minimum of human intervention. EDI is generally understood to mean specific interchange methods agreed upon by national or international standards bodies for the transfer of business transaction data, with one typical application being the automated purchase of goods and services. EDI standards include United Nations/Electronic Data Interchange For Administration, Commerce, and Transport (UN/EDIFACT), American National Standards Institute Accredited Standards Committee (ANSI ASC) X12, TRADACOMS by the Article Number Association (ANA), the Uniform Communication Standard (UCS), and the like.

EDI standards are independent of lower level technologies and should be distinguished from the transmission method used to convey EDI formatted information. Common transmission methods for EDI formatted data include bisynchronous modem transfers, email transfers, file transfer protocol (FTP) transfers, Telnet transfers, Hypertext Transport Protocol (HTTP) based transfers, and the like. All information contained in an EDI transaction set is, for the most part, the same information as that presented within a conventionally printed document.

To illustrate, FIG. 1 shows a purchase order document 110 and an equivalent EDI document 150. Both documents 110 and 150 include header 160 information, body 162 information, detail 164 information, and summary 166 information. The EDI document 150 is highly dependant upon a series of standardized codes, which can specify business transactions details in a clear, unambiguous manner to minimize miscommunications.

Any company can format business transaction in accordance with EDI standards and can be assured that the transaction is receivable by other companies having systems configured to accept and process EDI formatted data. An EDI format can be, and often is, used as a standardized and/or intermediate format that is utilized to communicate between dissimilar data systems of different companies. For example, Company A can transform information from its internal representation (either manually or through the aid of an automated conversion tool) to a known EDI format, which is conveyed to Company B, where it is converted into an internal format used by Company B. It should be noted that a number of commercially available message routing/transformation/integration tools, such as WEBSPHERE TRANSFORMATION EXTENDER by IBM Corporation of Armonk, N.Y., can facilitate the automated conversions from EDI to a company's internal format.

Despite the maturity and widespread use of EDI, no satisfactory standards exist for generating EDI transaction reports. The EDI standard itself supports acknowledgements, which are EDI transactions that describe the original EDI and any errors contained in transmitted EDI data. The traditional use of EDI acknowledgements has been to debug data. Information in conventionally implemented acknowledgements is very limited and debugging bad EDI data solely using acknowledgments is very difficult and requires strong EDI expertise.

A number of enhanced reporting EDI tools have been provided by various venders. One such report, which is part of the TRANSFORMATION EXTENDER HIPAA Pack, is often referred to as "Translated Acks." Each Translated Acks report is created from a map in the TRANSFORMATION EXTENDER Compliance Check module and is written using JAVASCRIPT and Hypertext Markup Language (HTML). The report has a coding structure that mimics the structure of the EDI data. The error discovery and correction process would be expedited if the EDI report were to be linked to the EDI source, which is not currently the case with conventional EDI reporting solutions.

SUMMARY OF THE INVENTION

The present invention provides hyperlinks within an EDI report that links reported data to an EDI transmission in accordance with an embodiment of the inventive arrangements disclosed herein. More specifically, transmitted EDI data can be "markup wrapped" so that EDI data can be tagged and formatted for presentation within a browser. The EDI report can include one or more links to tags in the wrapped EDI data. When a linked section of the EDI report is selected, a user can be automatically linked to a tagged portion of the wrapped EDI data corresponding to the link.

For example, an error appearing within the EDI report can be linked to a line in a source EDI data set that corresponds to the error. Linking the EDI reports to the EDI data being reported can permit a user to quickly identify errors in EDI data and to quickly make suitable corrections. No known conventional EDI reporting mechanism currently provides this capability.

The present invention can be implemented in accordance with numerous aspects consistent with material presented herein. For example, one aspect of the present invention can include an interface for reporting EDI results. The interface can include an EDI report section and an EDI source section. The EDI report section can interactively present EDI reports for EDI source data. The EDI source section can interactively present EDI source data for which one of the EDI reports has been generated. The EDI reports and the EDI source data can be markup based documents. Each EDI report rendered within the EDI report section can include one or more hyperlinks. Each rendered hyperlink can be mapped to a designated portion of the EDI source data.

Another aspect of the present invention is a method for reporting EDI results. The method can identify an electronic document including a text based EDI data set. A markup document including the EDI data set can be automatically generated, where the markup document includes one or more added tags. An EDI report can be created for the EDI data set, where the report has a nesting structure similar to a structure of the EDI data set. The EDI report can be a markup based document that includes at least one link that maps to the added tags of the generated markup document.

Yet another aspect of the present invention can include a system for reporting EDI results that includes an EDI reporting engine. The EDI reporting engine can generate a markup document from a text based EDI data set. The generated markup document can include one or more added tags, such as markup tags and/or anchor tags. The EDI reporting engine can create an EDI report for the EDI data set that has a nesting structure similar to a structure of the EDI data set. The created report can be a markup based document that contains at least one link that maps to the added tags of the generated markup document.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a schematic diagram of a system that provides enhanced EDI reporting through the use of hyperlinks in accordance with an aspect of the inventive arrangements presented herein.

FIG. 3 provides a code example that illustrates a markup wrapping of EDI data in accordance with an embodiment of the inventive arrangements disclosed herein.

FIG. 4 provides an example of an EDI report in accordance with an embodiment of the inventive arrangements disclosed herein.

FIG. 5 is an excerpt of source markup code for an EDI report having links to markup wrapped EDI source data in accordance with an embodiment of the inventive arrangements disclosed herein.

DETAILED DESCRIPTION OF THE INVENTION

Figure 1:
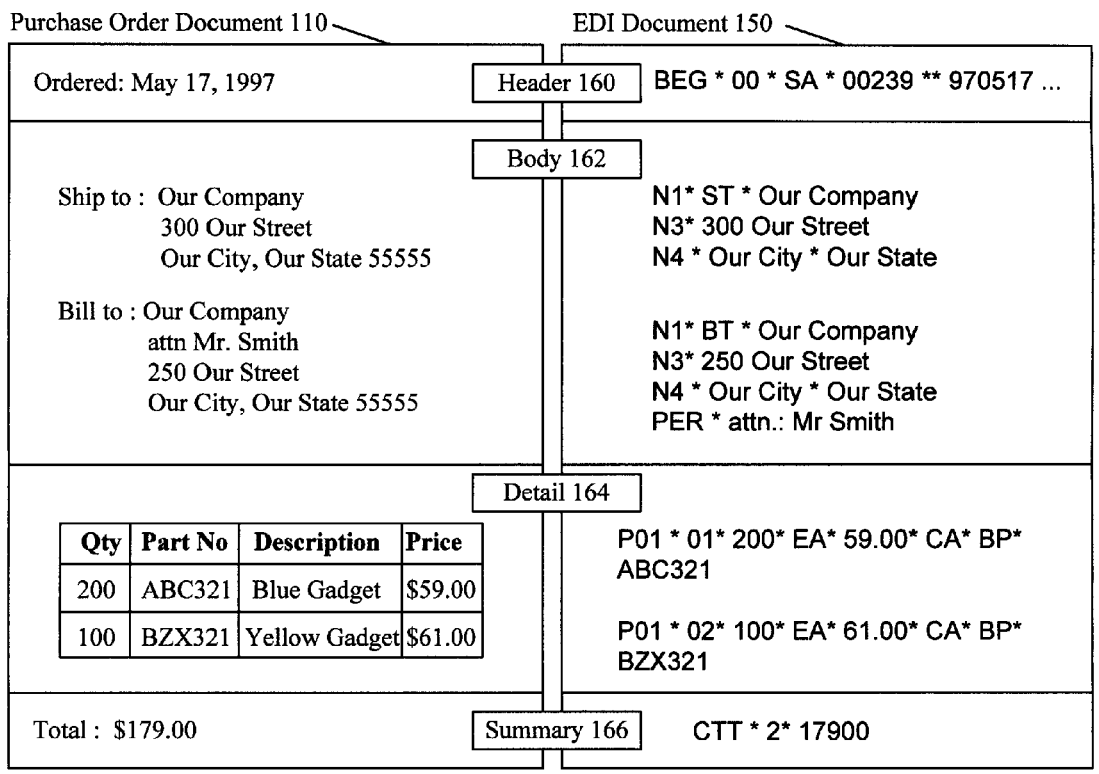
FIG. 1 shows a purchase order document and an equivalent Electronic Data Interchange (EDI) document.

FIG. 2 is a schematic diagram of a system 200 that provides enhanced Electronic Data Interchange (EDI) reporting through the use of hyperlinks in accordance with an aspect of the inventive arrangements presented herein.

System 200 can include a computing device 220 upon which EDI transaction engine 230 and EDI reporting engine 232 reside. EDI transaction engine 230 can represent any software engine configured to send and/or receive EDI transmissions. For example, engine 230 can be used to send EDI transmission 212 over network 215 to computing device 210. Engine 230 can also receive and process EDI response 214 from computing device 210.

In one embodiment, the EDI transaction engine 230 can include data conversion tools that automatically generate EDI formatted data from an internal data format, such as a format used by an internal database. The EDI transaction engine 230 can similarly convert incoming EDI formatted data into an internal company-specific format. In one embodiment, the EDI transaction engine 230 can include a WEBSPHERE TRANSFORMATION EXTENDER based engine. The invention is not to be construed as limited in this regard, however, and any other EDI tool can be part of the EDI transaction engine 230.

EDI reporting engine 232 can generate markup based EDI reports that can be rendered within browser 222. Two different types of linked reports can be generated by engine 232, which are displayed within EDI report section 224 and EDI source section 226, respectively. In one embodiment, the different sections 224 and 226 can be simultaneously displayed (not shown) within different frames or portions of an interface. In another embodiment, a tabbed interface can selectively present section 224 and 226.

In one embodiment, the EDI reporting engine 232 can be linked to an internal error checking procedure, such as a compliance check module that may be a component of EDI transmission engine 230. Accordingly, EDI reports of errors in EDI data can be generated before EDI transmissions 212 are sent from computing device 220. In another embodiment, the EDI reporting engine 232 can result from acknowledgements or transmission responses 214 received from a computing device 210 in response to a previously sent EDI transmission 212.

Further, the EDI reporting engine 232 is able to convert a format of an externally generated report, such as a Health Insurance Portability and Accountability Act of 1996 (HIPAA) EDI report, to a two part format customized for section 224 and 226. The reports generated by engine 232 can incorporate information obtained from multiple compliance checks or modules into a single report. For example, engine 232 can incorporate information from a WEBSPHERE TRANSFORMATION EXTENDER compliance module and information from an HIPAA compliance check routine.

Additionally, the EDI reporting engine 232 can generate reports that are conveyed to any remotely located device including, for example, an administrative console used to remotely administer device 220. Because the EDI reporting engine 232 generates markup based reports, the reports can be rendered within any suitable browser capable of interpreting the markup. Different markup can be utilized with the invention detailed herein including, but not limited to, hypertext markup language (HTML), extensible markup language (XML), Wireless Markup Language (WML), VoiceXML, XML+Voice (X+V), and the like.

EDI report section 224 can interactively present EDI reports having a nesting structure similar to the structure of the EDI data set for which each of the reports has been generated. For example, the nesting structure can have a series of nested layers, such as an interchange layer, a functional group layer, a transaction set layer, and a segment layer. In one embodiment, an expansion selector 221 can be presented for each layer. The expansion selector 221, which can be a plus (+) or minus (−) sign, can be used to expand and collapse a view of nested levels.

Different portions of EDI reports can be color coded for quick identification of problems. For example, different color codes can be used to represent an error state, such as red for an error 225, amber for contains errors, or green for contains no errors. Error codes can also be written in text so that the color associated with the code is not the only differentiator.

Links 227, 228, and 229 can be included in the EDI report, where the links 227-229 are bound to portions of the EDI source 226. Each of the links 227-229 can be bound to tags and/or anchors that have been inserted into the markup wrapped version of the EDI data. When link 227 is selected, the interchange for a transaction set from the original EDI data can be dynamically presented in EDI source 226. Link 228 can result in an interactive presentation of data for the selected functional group. Link 229 can result in the presentation of data for the selected transaction set.

In one embodiment, each link 227-229 can be associated with a particular line in the EDI data set presented in the EDI source section 226. Moreover, a user configurable line number can be presented before each line of the EDI data set.

As used herein, EDI transmission 212 and EDI response 214 can include any message formatted in accordance with an EDI specification. The specification can be formatted in accordance with the ANSI ASC X12 standards or any other EDI standard including, but not limited to, UN/EDIFACT, TRADACOMS, and USC. Additionally, EDI messages (including transmission 212 and response 214) can be conveyed using any transmission method, including email transmissions, possibly conforming to IETF publication RFC 3335, HTTP, FTP, and other Internet Protocol based transmissions, as well as older transmission methods, such as bisynchronous modem transmissions.

Computing device 210 and 220 can be any computing device including device readable instructions that cause each of the devices 210 and 220 to accept, transmit, process, or report EDI based transactions. For example, devices 210 and 220 can include a computer, a server, a Web appliance, a laptop, an electronic tablet, a personal data assistant, a consumer electronic device having a voice interface and/or a graphical user interface, a mobile telephone, and the like.

Network 215 can include any hardware/software/and firmware necessary to convey data encoded within carrier waves. Data can be contained within analog or digital signals and conveyed though data or voice channels. Network 215 can include local components and data pathways necessary for communications to be exchanged among computing device components and between integrated device components and peripheral devices. Network 215 can also include network equipment, such as routers, data lines, hubs, and intermediary servers which together form a data network, such as the Internet. Network 215 can also include circuit-based communication components and mobile communication components, such as telephony switches, modems, cellular communication towers, and the like. Network 215 can include line based and/or wireless communication pathways.

FIG. 3 provides a code example that illustrates a markup wrapping of EDI data in accordance with an embodiment of the inventive arrangements disclosed herein. FIG. 3 includes EDI data set 310 and markup wrapped EDI 320. Markup wrapped EDI 320 adds markup tags and well as anchor tags to the EDI data set 310. An addition of optional line numbers is also shown in markup wrapped EDI 320.

FIG. 4 provides an example of an EDI report 410 in accordance with an embodiment of the inventive arrangements disclosed herein. EDI report 410 can represent an enhancement of a conventional EDI report, such as one generated using the TRANSFORMATION EXTENDER HIPAA Pack product.

More specifically, report 410 can be a markup based report that adds links 415 to the anchors in the markup wrapped EDI data file shown in FIG. 3. As shown, report 410 mimics the nesting structure of an EDI data set. Nesting levels can include an interchange level, a functional group level, a transaction set level, and a segment level, as shown.

FIG. 5 is an excerpt of source markup code for an EDI report having links to markup wrapped EDI source in accordance with an embodiment of the inventive arrangements disclosed herein. Specifically, the code 510 can be an excerpt of markup code used to generate EDI report 410.

It should be appreciated that different markup languages can be utilized for markup wrapped EDI 320 and report 410 depending upon a target markup interpreter or markup browser. For example, HTML can be used for presentation in a visual browser, VXML can be used for presentation with a voice browser, WML can be used for presentation upon a wireless mobile device, X+V can be used for presentation within a multimodal browser, and the like. Accordingly, it should be readily understood that particular details expressed in FIGS. 3, 4, and 5 are provided to illustrate a general inventive concept detailed herein and derivatives and adaptations of the illustrated concept are to be considered within the scope of the present inventive.

Figure 6:
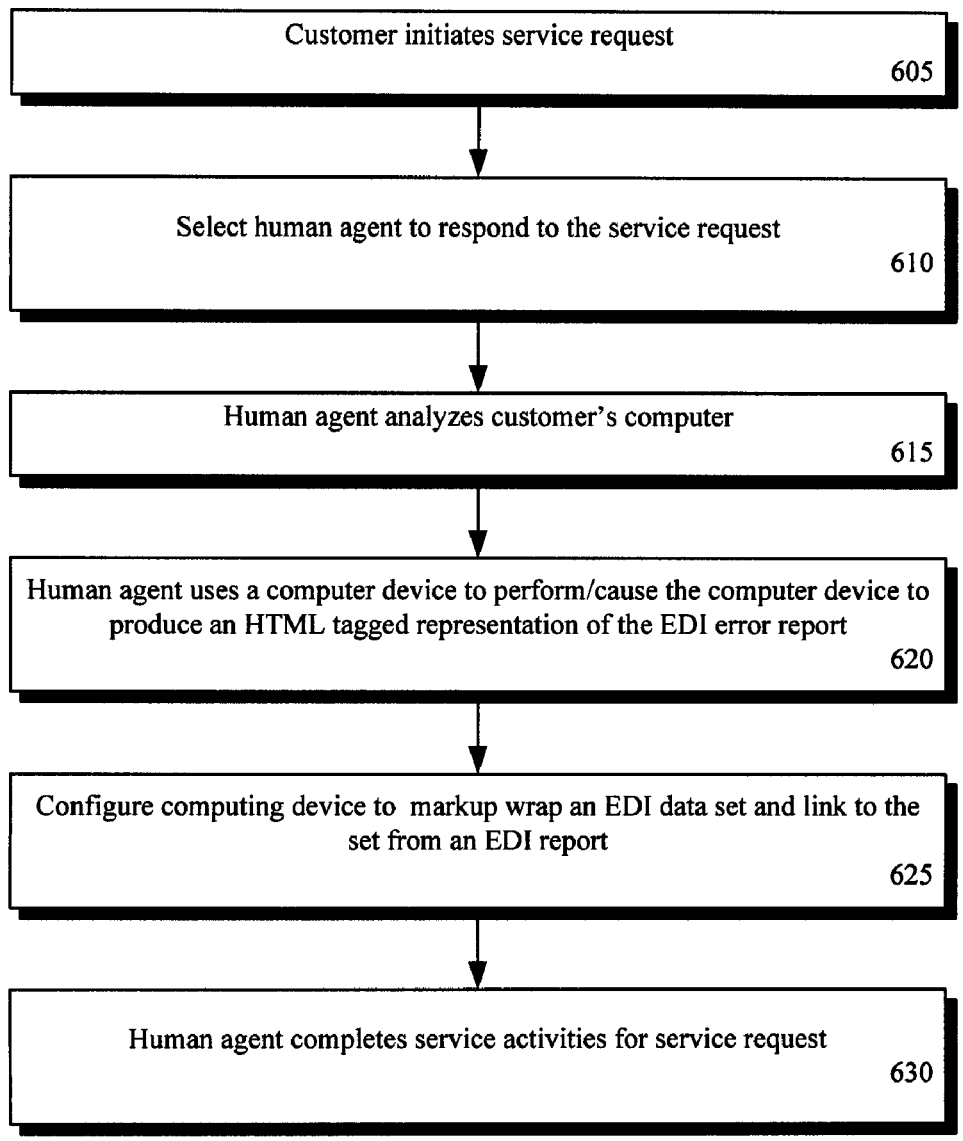
FIG. 6 is a flow chart of a method where a service agent can configure a system for markup wrapped EDI source data that is linked to an EDI report in accordance with an embodiment of the inventive arrangements disclosed herein.

FIG. 6 is a flow chart of a method where a service agent can configure a system for markup wrapped EDI data that is linked to an EDI report in accordance with an embodiment of the inventive arrangements disclosed herein. Method 600 can be preformed in the context of system 200.

Method 600 can begin in step 605, when a customer initiates a service request. The service request can be a request for a service agent to establish a new EDI reporting system with hyperlinks to EDI source data. The service request can also be a request to troubleshoot a problem with an EDI reporting system or to provide an enhancement for an EDI reporting system.

In step 610, a human agent can be selected to respond to the service request. In step 615, the human agent can analyze a customer's current system and can develop a solution. The solution can result in a system 200 or any system where EDI reports linking to markup wrapped EDI data sets are included.

In step 620, the human agent can configure the customer's system to produce an HTML tagged representation of the EDI error report. In step 625, the human agent can configure the customer's system to markup wrap an EDI data set and to create a link to the set from the EDI error report. The human agent can perform steps 620 and 625 and/or can configure a computing device of the customer in a manner that the customer or clients of the customer can perform steps 620 and 625 using the configured system in the future. For example, the service agent can load and configure software and hardware so that a user can generate/utilize EDI reports containing hyperlinks to markup wrapped EDI source data. In step 630, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

What is claimed is:

1. A computer-implemented interface embodied on a computer readable storage medium for reporting electronic data interchange (EDI) results at a computer, comprising:

an EDI report section generated by the computer from EDI source data to interactively present EDI reports for the EDI source data, wherein each of the EDI reports mimics a nesting structure of the EDI source data, wherein the nesting structure has a plurality of levels, the report including a hyperlink at each level of the nesting structure, and wherein each nesting level further includes EDI data for the nesting level in addition to the hyperlink, and wherein each hyperlink maps to a designated portion of the EDI source data; and an EDI source section configured to interactively present EDI source data for which one of the EDI reports has been generated, wherein the EDI reports and the EDI source data are markup based documents, and wherein the hyperlinks of the EDI reports are color coded, wherein each different colored link indicates a different error status.

2. The interface of claim 1, wherein each line of the EDI source data presented within the EDI source section is associated with a configurable line number, wherein line numbers are selectively enabled and disabled responsive to user preference settings established within the interface.

3. The interface of claim 1, wherein each EDI report comprises:

a plurality of expansion selections configured to selectively expand and hide corresponding levels of the EDI report.

4. The interface of claim 1, wherein the nesting structure comprises an interchange level, a functional group level, and a transaction set level.

5. The interface of claim 1, wherein the markup document including the EDI source data that is presented within the EDI source section is automatically generated from a textual EDI data set.

6. The interface of claim 5, wherein anchor tags are added to the markup document when it is automatically generated, wherein at least one of the hyperlinks map to an added one of the tags.

7. The interface of claim 6, wherein the tags conform to at least one of a Hyper Text Mark-Up Language (HTML), an Extensible Markup Language (XML), and a markup language based upon XML.

8. The interface of claim 1, wherein the EDI report and the EDI source data conform to an American National Standards Institute Accredited Standards Committee (ANSI ASC) X12 based standard.

9. The interface of claim 1, wherein the EDI report and the EDI source data conform to a health insurance portability and accountability act (HIPAA) EDI based standard.

10. A method for reporting electronic data interchange (EDI) results comprising:

identifying an electronic document including a text based EDI data set;

automatically generating a markup document including the EDI data set, which includes a plurality of added tags; and creating an EDI report for the EDI data set having a nesting structure that mimics a nesting structure of the EDI data set, the nesting structure having a plurality of levels, wherein the EDI report is a markup based document including at least one link at each of a plurality of nesting levels that maps to one of the added tags of the generated markup document, wherein the nesting levels include an interchange level, a functional group level, a transaction set level and a segment level, and wherein EDI data is displayed at each level with the link;

wherein said steps of identifying, generating, and creating are performed by at least one machine in accordance with at least one computer program having a plurality of code sections that are executable by the at least one machine.

11. The method of claim 10, further comprising:

presenting the generated markup document and the EDI report within a browser, wherein the browser includes a plurality of expansion selections configured to selectively expand and hide corresponding levels of the EDI report.

12. The method of claim 10, wherein said steps of claim 14 are performed by at least one machine in accordance with at least one computer program having a plurality of code sections that are executable by the at least one machine.

13. The method of claim 10, wherein the steps of claim 14 are performed by at least one of a service agent and a computing device manipulated by the service agent, the steps being performed in response to a service request.

14. A system for reporting electronic data interchange (EDI) results implemented on a computing device comprising:

an EDI reporting engine configured to generate a markup document from a text based EDI data set, where the generated markup document includes a plurality of added tags, wherein the EDI reporting engine is also configured to create an EDI report for the EDI data set that has a nesting structure which mimics a structure of the EDI data set, including a plurality of nesting levels, wherein the nesting structure of the EDI data set comprises an interchange level, a functional group level, a transaction set level, and a segment level, wherein the created report is a markup based document that contains at least one link on a plurality of the nesting levels that maps to the added tags of the generated markup document; and an interface for presenting the EDI report and the generated markup document, wherein each nesting level includes EDI data.

* * * * *